F. S. PARRIGIN.

BASE PLATE.

APPLICATION FILED DEC. 23, 1912.

Reissued July 27, 1915.

13,953.

2 SHEETS—SHEET 1.

Witnesses

W. C. Fielding,

R. B. Cavanagh.

Inventor

F. S. Parrigin,

By Crosby & Crosby

Attorneys

COLUMBIA PLANOGRAPH CO., WASHINGTON, D. C.

F. S. PARRIGIN.

BASE PLATE.

APPLICATION FILED DEC. 23, 1912.

Reissued July 27, 1915.

13,953.

2 SHEETS—SHEET 2.

Witnesses

W. C. Fielding,

R. B. Cavanagh.

Inventor

F. S. Parrigin,

By Chandlee & Chandlee

Attorneys

COLUMBIA PLANOGRAPH CO., WASHINGTON, D. C.

UNITED STATES PATENT OFFICE.

FRANK S. PARRIGIN, OF LEXINGTON, KENTUCKY.

BASE-PLATE.

13,953. Specification of Reissued Letters Patent. Reissued July 27, 1915.

Original No. 1,026,962, dated May 21, 1912, Serial No. 657,638. Application for reissue filed December 23, 1912. Serial No. 738,391.

*To all whom it may concern:*

Be it known that I, FRANK S. PARRIGIN, a citizen of the United States, residing at Lexington, in the county of Fayette, State of Kentucky, have invented certain new and useful Improvements in Base-Plates; and I do hereby declare the following to be a full, clear, and exact description of the invention, such as will enable others skilled on the art to which it appertains to make use of the same.

This invention relates to new and useful improvements in base plates for engagement with railway ties and rails.

An object of this invention is the provision of a novelly constructed base plate which is adapted to engage the ties, rails and fish plates at the meeting ends of a pair of rails and hold the same securely against displacement.

Another object of this invention is to improve and simplify devices of this character rendering them comparatively simple and inexpensive to manufacture, reliable and efficient in use and readily operated.

With the above recited objects and others of a similar nature in view, my invention consists in the construction, combination and arrangement of parts set forth in and falling within the scope of the appended claims.

Figure 2:
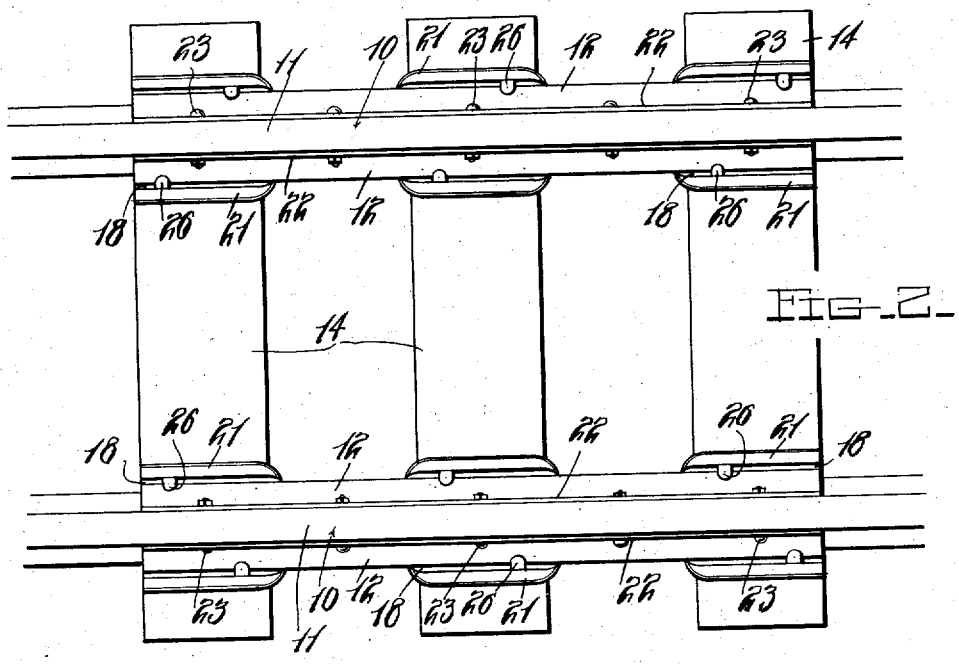
Figure 1:
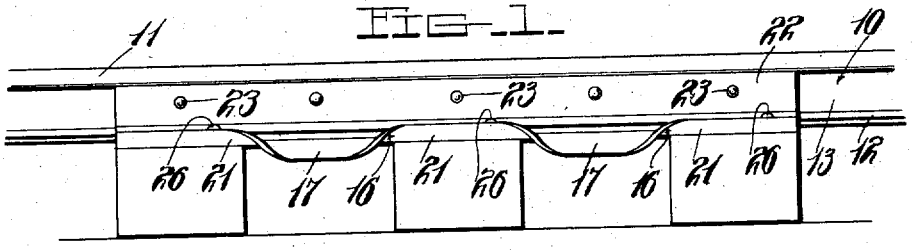
Figure 4:
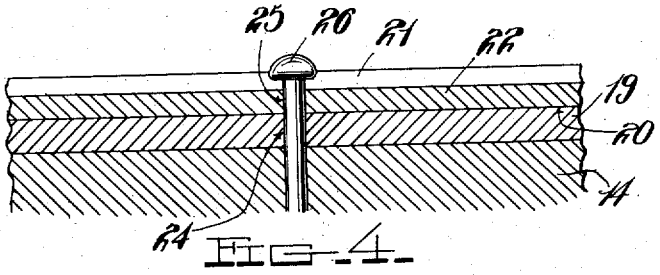
Figure 3:
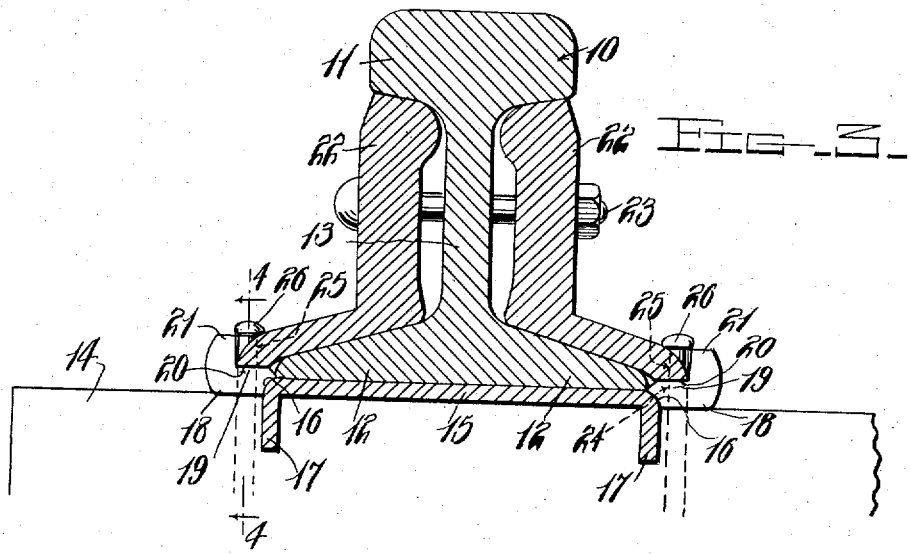
Figure 5:
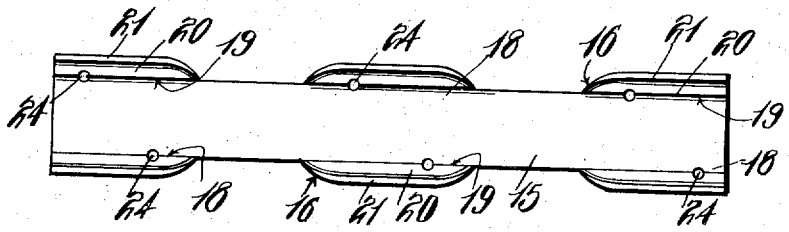
Figure 6:
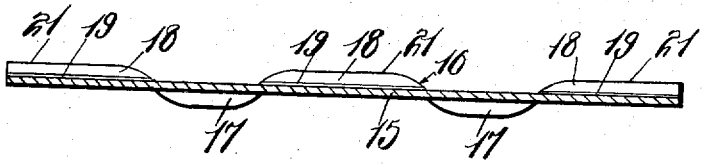

In the accompanying drawings: Figure 1 is a side elevation of my invention. Fig. 2 is a top plan view thereof. Fig. 3 is a transverse sectional view thereof. Fig. 4 is a longitudinal sectional view taken on the line 4—4 of Fig. 3. Fig. 5 is a top plan view of the base plate removed; and Fig. 6 is a longitudinal sectional view thereof.

In the present instance I propose to provide a base plate upon which the base portions of the meeting ends of a pair of rails are adapted to rest. This plate is provided adjacent its longitudinal edges with oppositely disposed seats running longitudinally of the plate and elevated above the upper surface of the plate proper, or that portion upon which the rail ends rest. At the outer longitudinal edge of each elevated seat is an upwardly extending or vertical flange which forms a shoulder in conjunction with such seat. When the plate is in use the longitudinal edges of the rail ends are confined by the inner longitudinal sides of the seats, while the bottom edges of the usual fish plates rest upon the seats and the vertical flanges of the latter form abutments or stops for preventing the outward lateral movement of such fish plates. Furthermore, the opposite longitudinal edges of the base plate at the portions thereof between the seats are bent to produce depending extensions or flanges which project between the adjacent sides of the ties and thus the creeping of the plate is obviated.

Referring to the accompanying drawings by similar characters of reference throughout the several views, the numeral 10 designates generally the meeting ends of a pair of rails, each of which comprises a head 11, outwardly extending base flanges 12 and a connecting web 13, the said rail ends being mounted upon the customary ties 14. A base plate 15 underlies the base flanges 12 of the rail ends and rests upon the ties 14. The opposite longitudinal edges of the base plate are bent as at 16 to produce depending extensions 17 which project between the adjacent sides of the ties 14 and horizontal extensions 18 enlarged adjacent the inner edges of the bends 16, as indicated by the numeral 19 to produce seats 20 which are elevated, or located in planes above the upper surface of the base plate 15 and parallel thereto.

The outer ends of the extensions 18 are provided with vertically extending lateral flanges 21 for engagement with the lower edges of the fish plates 22 which engage the opposite sides of the rail ends and are securely retained thereon against displacement by the usual clamping bolts 23. The enlargements 19 of the extensions 18 are each provided with vertically extending openings 24 which aline with slots 25 formed in the lower edges of the fish plates 22. These openings and slots 24 and 25 receive the shanks of spikes 26 which engage the ties and securely hold the fish plates and base plates against any undesired longitudinal movement.

The heads of the spikes 26 rest upon the edges of the flanges 21 and rest upon the fish plates 22 for the purpose of preventing any undesired displacement thereof.

From the foregoing description taken in connection with the drawings it will be seen that I have provided an exceedingly efficient base plate which will prevent the deflection of the rails at their meeting ends, and will also hold the fish plates in proper position to accomplish their functions.

What I claim is:

1. A railway base-plate comprising an elongated plate-like body portion upon which the meeting ends of a pair of rails are adapted to rest, said body portion having both its longitudinal edge portions provided with a plurality of spaced vertically and upwardly extending flanges and a plurality of spaced longitudinally extending, horizontally disposed elevated seats, which seats lie between the side edges of the base portions of the rails and the vertical flanges when the rails are positioned on the plate, said seats being adapted to have the bottom edge portions of the fish plates rest thereon, the outward movement of such fish plates being prevented by the vertical flanges.

2. A base plate comprising a body portion adapted to underlie the meeting ends of a pair of rails, depending extensions provided on the longitudinal edges of the base plate and adapted to extend between and engage with supporting ties for the rails, horizontal extensions provided upon the longitudinal edges of the base plate between the said depending extensions, enlargements formed upon the horizontal extensions in planes above the plane of the upper side of the base plate and parallel therewith, and vertically extending lateral flanges formed upon the outer sides of the enlargements, said lateral flanges being adapted to prevent the outward movement of the fish plates engaging the opposite sides of the rail and resting upon the seats produced by the parallel faces of the enlargements.

3. A base plate comprising a body portion adapted to underlie the meeting ends of a pair of rails, depending extensions provided on the longitudinal edges of the base plate and adapted to extend between and engage with supporting ties for the rails, horizontal extensions provided upon the longitudinal edges of the base plate between the said depending extensions, enlargements formed upon the horizontal extensions in planes above the plane of the upper side of the base plate and parallel therewith, vertically extending lateral flanges formed upon the outer side of the enlargements, said lateral flanges being adapted to prevent the outward movement of the fish plates engaging the opposite sides of the rail and resting upon the seats produced by the parallel faces of the enlargements, and spikes passing through slots formed in the lower edges of the fish plates and openings formed in the enlargements for engagement with the ties.

FRANK S. PARRIGIN.

Witnesses:
JOHN L. SNEED,
W. J. DE LOACH.

Copies of this patent may be obtained for five cents each, by addressing the "Commissioner of Patents, Washington, D. C."